Figure 1:
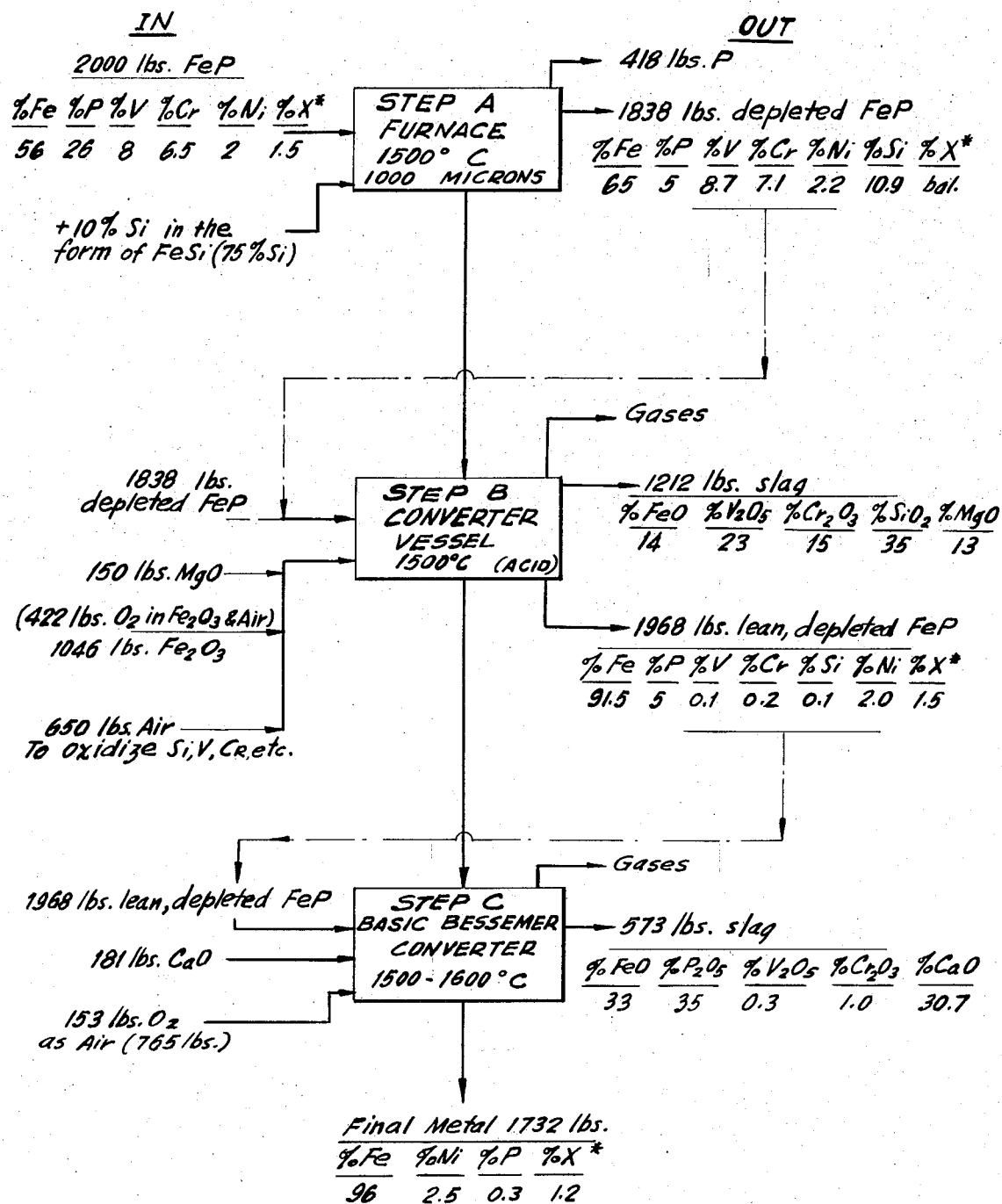

United States Patent
Cosman et al.

[15] 3,699,213
[45] Oct. 17, 1972

[54] DEPHOSPHORIZATION OF FERROPHOSPHORUS

[72] Inventors: Cornelius M. Cosman, Bronxville, N.Y.; Donald O. Buker, Grand Junction, Colo.

[73] Assignee: American Metal Climax, Inc., New York, N.Y.

[22] Filed: Dec. 24, 1969

[21] Appl. No.: 888,000

[52] U.S. Cl.....................................423/322, 75/132
[51] Int. Cl..........................C01b 25/02, C22c 33/00
[58] Field of Search...........................75/132; 23/223

[56] References Cited

UNITED STATES PATENTS

| | | | |
|---|---|---|---|
| 1,265,076 | 5/1918 | Gray | 75/132 |
| 1,863,642 | 6/1932 | Stimson | 75/132 |
| 1,836,618 | 12/1931 | Pokorny | 23/223 |
| 3,231,335 | 1/1966 | Bills et al. | 23/223 |
| 3,305,355 | 2/1967 | Darrow et al. | 23/108 X |

OTHER PUBLICATIONS

Van Wazer, Phosphorus and its Compounds, Vol. 2 pp. 1,160, 1,172, 1,181, 1,194– 1,195 (Intersciene – 1961)

*Primary Examiner*—Oscar R. Vertiz
*Assistant Examiner*—Charles B. Rodman
*Attorney*—Kasper T. Serijan and Eugene J. Kalil

[57] ABSTRACT

A method is provided for the dephosphorization of ferrophosphorus containing about 20 to 30 percent phosphorus, with or without vanadium, chromium, nickel, manganese, etc., and the bulk of the ferrophosphorus alloy comprising essentially iron, wherein a bath of said ferrophosphorus is established containing at least one additive selected from the group consisting of carbon and silicon in amounts effective to reduce the solubility of phosphorus in said bath, thereby resulting in a substantial amount of phosphorus vapor which is removed and then recovered.

2 Claims, 2 Drawing Figures

DEPHOSPHORIZATION OF FERROPHOSPHORUS

This invention relates to the dephosphorization of ferrophosphorus, whereby the phosphorus may be recovered, and whereby a ferrous material of improved quality and value is provided having particular utility in the production of steel and cast iron.

Ferrophosphorus is produced as a by-product in the manufacture of phosphorus by the reduction of phosphate ores. Such ores exist in the western part of the United States, among other places, and comprise substantial amounts of $P_2O_5$ (e.g., 34 percent) in the form of dry calcium phosphate. The calcium content of the ore may range by weight from about 30 to 50 percent expressed as CaO and contains in addition silica, iron oxide, and sometimes small amounts of oxides of vanadium, chromium, nickel and also manganese, as well as organic matter and clay. The amount of vanadium as $V_2O_5$ may range from about 0.05 to 1 percent by weight.

Generally speaking, the contained phosphorus is extracted by employing electric furnace smelting techniques as described in U.S. Pat. Nos. 3,154,410 and 3,305,355. Broadly, this method comprises providing a charge of coke and ore and smelting the charge in an electric furnace under reducing conditions which cause the phosphorus to be reduced to the elemental phase and at the temperature prevailing volatilized and drawn off, condensed and recovered. The metallic oxides upon reduction form phosphides which pass through the slag and collect as a molten pool of ferrophosphorus at the bottom of the furnace. The slag contains calcium oxide, silica, alumina and the like. Periodically, the slag and ferrophosphorus are tapped from the furnace.

The ferrophosphorus produced in the foregoing manner from Western ore may contain 20 to 30 percent by weight of phosphorus, up to about 15 percent vanadium, more generally 2 to 9 percent, up to about 8 percent chromium, and usually up to about 2 percent nickel, and the balance essentially iron. The foregoing byproduct has found some use in the steel industry as a ferrophosphorus (ferrophos) addition agent.

As is well known to those skilled in the art, ferrophosphorus is also produced from other phosphate ores, such as those in the southern part of the United States, which do not contain all the elements recited hereinabove, but which may contain relatively high manganese instead. Whatever the composition of the ferrophos, the market for it in the iron and steel industry has not been economically attractive. This has been particularly true of the ferrophos produced in the western part of the United States which is located far from the market, although it is recognized as being intrinsically valuable.

Methods have been proposed for recovering the vanadium from Western ferrophos by passing oxygen through molten ferrophos at a temperature within the range of about 1,300° C to 1,560° C whereby to concentrate the vanadium and chromium in the slag, which slag, containing as much as 15 percent vanadium as $V_2O_5$, is then processed to recover the vanadium.

One method proposed for recovering the vanadium (note U.S. Pat. No. 3,154,410) is to grind the vanadium-rich concentrate (i.e., slag) in a ball mill with 50 percent sodium chloride to a fineness exceeding 150 mesh. The material thus prepared is charged to a multiple hearth furnace and roasted at a temperature in the range of about 600° C to 800° C and the roasted concentrate thereafter leached with water to recover the vanadium as sodium vanadate which is then recovered from solution by known chemical methods.

However, the residual ferrophos remaining after slagging off the vanadium concentrate is still relatively high in phosphorus (e.g., 23 percent) which has only the limited use as a source of phosphorus in steel making. Thus, the cost of the foregoing process is borne solely by the recovered vanadium which puts a limit on the overall economics of the process.

It is known to treat high phosphorus iron in a destructive distillation process (U.S. Pat. No. 3,231,335) to lower the phosphorus content, but such processes have not been too efficient.

It would be desirable to provide a process in which the by-product ferrous metal remaining after vanadium recovery also contains low phosphorus so as to increase the uses and value of the by-product ferrous metal and thus upgrade the economics of the vanadium recovery. It would furthermore be desirable to recover phosphorus in its elemental form, thereby greatly enhancing the economics of the operation.

We have now discovered a process whereby we can efficiently dephosphorize ferrophos to levels whereby the value and use of the ferrous product remaining are greatly enhanced, while also recovering elemental phosphorus. In addition, our process is unique in that it can be applied to vanadium-containing ferrophos so that the recovery of vanadium is rendered additionally attractive from an economic viewpoint.

It is thus the object of this invention to provide a process whereby ferrophos can be efficiently dephosphorized to levels whereby the resulting ferrous product is greatly enhanced in value and use.

It is a further object of this invention to provide a process which permits the recovery of phosphorus in the elemental form.

Another object is to provide a process for dephosphorizing vanadium-containing ferrophos in which vanadium is also recovered as a by-product.

Figure 2:
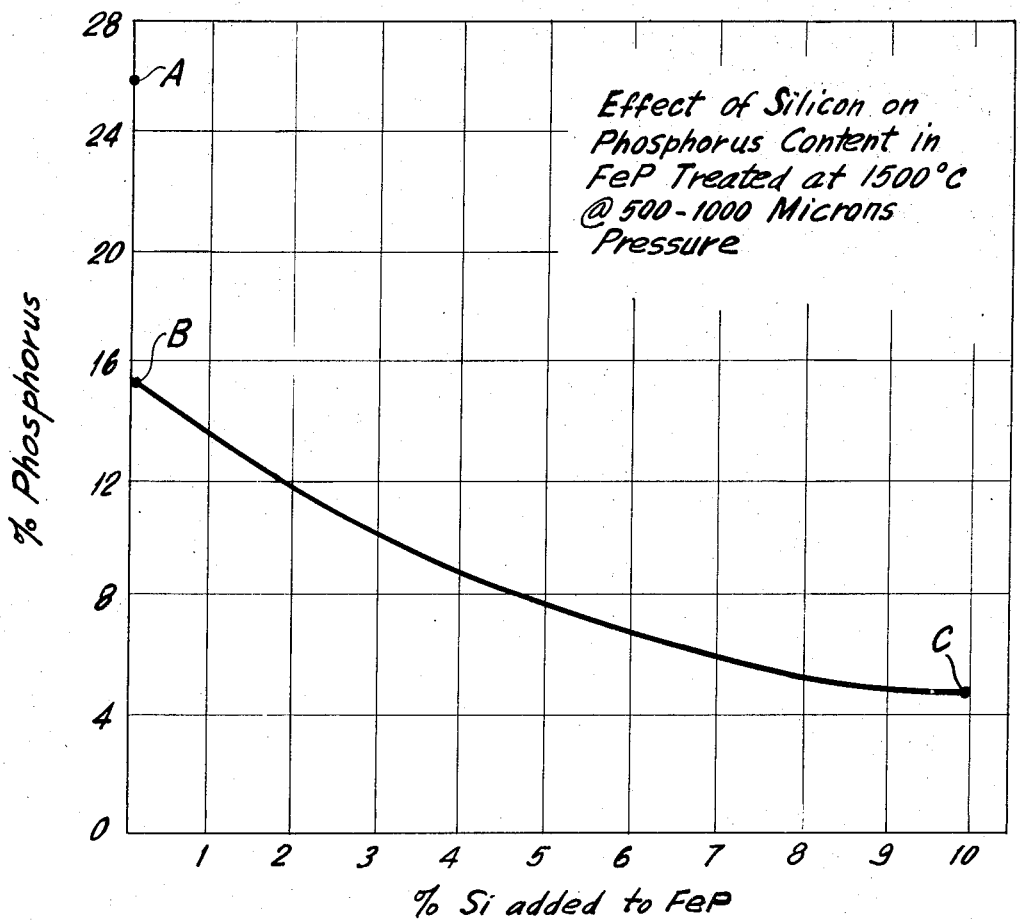

These and other objects will more clearly appear from the following disclosure and the accompanying drawing wherein:

FIG. 1 is a flow sheet illustrating a preferred embodiment for carrying out the invention; and FIG. 2 depicts a curve showing the effect of silicon additions on the dephosphorization of ferrophos.

Stating it broadly, the invention resides in a process for the vacuum recovery of phosphorus from ferrophos containing by weight about 20 to 30 percent phosphorus, up to about 15 percent vanadium (e.g. 2 to 9 percent), up to about 7 percent chromium (e.g., 2 to 6 percent), possibly some nickel, small amounts of manganese, copper, etc., and the balance essentially iron. In its more preferred aspects, the invention includes the separation of vanadium from ferrophos for subsequent recovery thereof. In essence, the invention comprises establishing a molten bath of ferrophos with an amount of at least one addition agent selected from the group consisting of up to about 5 percent carbon and up to about 15 percent silicon by weight effective to reduce the solubility of the phosphorus in said bath, thereby resulting in a substantial amount of phosphorus vapor, leading off the resulting vapor, and then recovering elemental phosphorus by condensation. Advantageously, the silicon addition may range from about 2 to 10 percent by weight and, more preferably, from about 5 to 10 percent, and the carbon from about 2 to 5 percent.

The invention may be carried out as part of the ore-smelting cycle in the electric furnace, or, alternatively, a bath of the ferrophos itself, after leaving the smelting furnace or, separately prepared, can be treated in a holding furnace or a ladle enclosed in a hood to remove the phosphorus. In either case, provisions are made to establish a vacuum above the melt. The treating temperature is minimally 1,400° C, but preferably in the range of 1,500° to 1,600° C.

By vacuum, we mean that amount of sub-atmospheric pressure necessary to effect evolution of gaseous phosphorus from the melt under the prevailing metallurgical conditions. As one skilled in the art will appreciate, during the evolution of phosphorus gas, the pressure in the system is determined by the phosphorus gas itself. When the reaction has been substantially completed and the rate of evolution of the phosphorus has declined, the pressure in the system will accordingly drop in proportion. The reaction is considered to be completed when the pressure in the system drops to below 10,000 microns, of mercury e.g. below 4,000 microns, and, more advantageously, below 2,000 microns.

In carrying out the process in accordance with FIG. 1, a bath of ferrophos is established and treated in accordance with steps A, B and C as one embodiment of the invention, it being understood that variations in the method may be employed in treating the ferrophosphorus within the broad aspects of the invention.

Step A

A melt of ferrophos is established in either an electric phosphorus smelting furnace provided with a suitable vacuum system, or a ferrophos product previously produced is placed either in the liquid or solid state into a vacuum furnace where heat is applied during the treatment. A typical ferrophos charge of 2,000 pounds shown in FIG. 1 may comprise approximately 56 percent Fe, 26 percent P, 8 percent V, 6.5 percent Cr, 2 percent Ni and 1.5 percent of other elements. The ferrophos containing about 10 percent silicon is maintained at a temperature of about 1,550° C under a vacuum produced as described hereinabove, in this case, 1,000 microns. The treatment is carried out to produce depleted ferrophos containing about 5 percent P. As will be noted from Step A in FIG. 1, 428 pounds P may be evaporated from the melt to produce depleted ferrophos containing approximately 65 percent Fe, 5 percent P, 9 percent V, 7 percent Cr, 2 percent Ni, 11 percent Si and the balance other elements (X).

Step B

The depleted ferrophos from Step A is then subjected to treatment in Step B by being placed into a converter vessel containing MgO as a slag-forming ingredient in the amount shown together with iron oxide for the purpose of oxidizing the silicon in the depleted ferrophos. In addition to the oxygen supplied by the iron oxide, more oxygen is provided by blowing air into the melt. This treatment causes vanadium, chromium and some iron to be oxidized and to pass into a slag indicated in Step B of FIG. 1 which is then available for further treatment for recovering vanadium or possibly chromium values. The residual metal, which is defined as lean depleted ferrophos, is still too high in phosphorus to have value as melting stock in conventional steel melting practice. It is then subjected to further treatment in Step C.

Step C

Step C consists of the treatment of the lean depleted ferrophos in a basic bessemer converter in which the molten bath is blown with air under a lime slag to remove the phosphorus to desirable low levels, such as 0.3 percent. This may involve double slag practice. It is preferred that the slag contain $P_2O_5$ in sufficient concentration to make it attractive as raw material for recycle to the electric phosphorus smelting furnace. It is possible by the foregoing technique to produce a final metal product containing about 2.4 percent Ni, 0.3 percent P, and the balance substantially Fe with small amounts of residual elements. This material has commercial usefulness as a nickel-containing melting stock for the production of alloy steels and irons.

As will be noted from the flow sheet, the treatment of 2,000 pounds of ferrophos may result in a final metal product of about 1,700 pounds, as well as 1,200 pounds of enriched vanadiferous slag, about 400 pounds of elemental phosphorus, and 500 to 600 pounds of recycle calcium phosphate slag.

The effectiveness of silicon as an additive for reducing the solubility of phosphorus in molten iron will be apparent from Table 1 which shows the results obtained with silicon additions ranging from about 1 to 10 percent by weight of the ferrophos bath containing about 26 percent phosphorus after about 1 hour of treatment at vacuums below 1,000 microns.

TABLE 1

| % Silicon by Wt. of Ferrophos | Final % P |
|---|---|
| 1 | 13.7 |
| 2 | 12.3 |
| 5 | 8.4 |
| 10 | 4.9 |

The foregoing data are illustrated graphically in FIG. 2, point "A" being the original phosphorus content of the ferrophos, and point "B" being the drop attributed to vacuum, while the further drop of over 10 percent between points "B" and "C" is attributed to the effectiveness of the silicon addition. As will be noted, additions of silicon of about 5 to 10 percent by weight based on ferrophos are particularly advantageous in lowering the phosphorus content.

As has been stated hereinbefore, carbon is also effective in the vacuum elimination of phosphorus, though not as efficient as silicon. The results of tests conducted with carbon on ferrophos containing about 26 percent P are given in the following table:

TABLE 2

| Test | Charge FeP | carbon (grce- | carbon (percent) | temp (°C) | time at temp (h- | Final vacuum | Final P |
|---|---|---|---|---|---|---|---|

| No. | (grams) | ams) | nt) | ours) | (microns) | (percent) |
|---|---|---|---|---|---|---|
| 1 | 99 | 1 | 1 | 1500 | 2 | 650 | 14.36 |
| 2 | 98 | 2 | 2 | 1500 | 2 | 50 | 12.35 |
| 3 | 97 | 3 | 3 | 1500 | 2 | 1 | 12.28 |
| 4 | 95 | 5 | 5 | 1500 | 2 | 275 | 13.00 |
| 5 | 1900 | 100 | 5 | 1600 | 1 | 180 | 14.3 |
| 6 | 1900 | 100 | 5 | 1600 | 1 | 40 | 12.7 |
| 7 | 1900 | 100 | 5 | 1700 | 1 | 140 | 13.9 |
| 8 | 3800 | 200 | 5 | 1700 | 1 | 75 | 13.3 |
| 9 | 1900 | 100 | 5 | 1500 | 1 | 70 | 15.6 |
| 10 | 3800 | 200 | 5 | 1870 | 1 | 1500 | 2.9 |

As will be noted from the table, the best results are obtained with carbon ranging from about 2 to 5 percent by weight of the bath. An important consideration in the use of carbon in place of silicon is its greater economy. Carbon may therefore be preferred where it is desired to recover phosphorus from ferrophosphorus and thereby improve the overall yield of phosphorus from apatite in the electric furnace process. Where there are present elements such as vanadium, chromium, nickel, manganese, etc. in sufficient concentration to warrant their recovery, it may be desired in order to facilitate metallurgical processing to use silicon in preference to carbon, or a combination of both, to lower the phosphorus to the greatest possible extent as described hereinbefore with respect to the FIG. 1 flow sheet.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. In a method for recovering phosphorus from ferrophosphorus containing by weight about 20 to 30 percent phosphorus and containing optionally up to about 15 percent vanadium, up to about 7 percent chromium, small amounts of other ingredients, and the balance essentially iron, the improvement which comprises, establishing a molten bath of said ferrophosphorus at a temperature of at least about 1,400° C under vacuum below 10,000 microns of mercury containing as an additive about 5 to 10 percent silicon effective to reduce further the solubility of said phosphorus in said bath under said vacuum, thereby forming a substantial amount of phosphorus vapor, removing the resulting vapor while maintaining said vacuum and then recovering said phosphorus.

2. The method of claim 1, wherein the vacuum is less than 2,000 microns.

* * * * *